US010205899B2

(12) United States Patent
Sakuragi

(10) Patent No.: US 10,205,899 B2
(45) Date of Patent: Feb. 12, 2019

(54) IMAGE SENSOR AND IMAGE SENSING APPARATUS

(71) Applicant: CANON KABUSHIKI KAISHA, Tokyo (JP)

(72) Inventor: Takamasa Sakuragi, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 136 days.

(21) Appl. No.: 15/427,190

(22) Filed: Feb. 8, 2017

(65) Prior Publication Data

US 2017/0244918 A1    Aug. 24, 2017

(30) Foreign Application Priority Data

Feb. 22, 2016 (JP) .................................. 2016-031460

(51) Int. Cl.
| | |
|---|---|
| H04N 5/225 | (2006.01) |
| H04N 5/363 | (2011.01) |
| H04N 5/369 | (2011.01) |
| H04N 5/3745 | (2011.01) |
| H04N 5/378 | (2011.01) |

(52) U.S. Cl.
CPC .......... *H04N 5/363* (2013.01); *H04N 5/3698* (2013.01); *H04N 5/378* (2013.01); *H04N 5/3745* (2013.01)

(58) Field of Classification Search
CPC ........................................ H04N 5/363–5/3658
See application file for complete search history.

(56) References Cited

U.S. PATENT DOCUMENTS

| | | | |
|---|---|---|---|
| 6,777,660 B1 | 8/2004 | Lee | |
| 7,023,482 B2 | 4/2006 | Sakuragi | |
| 8,278,613 B2 | 10/2012 | Okita et al. | |
| 8,638,384 B2 | 1/2014 | Sakuragi | |
| 8,884,864 B2 | 11/2014 | Sakuragi | |
| 2002/0030152 A1* | 3/2002 | Afghahi ................. | H04N 5/361 |
| | | | 250/208.1 |
| 2002/0182788 A1* | 12/2002 | Pain ....................... | H04N 5/357 |
| | | | 438/152 |
| 2012/0043454 A1 | 2/2012 | Sakuragi | |
| 2012/0119787 A1* | 5/2012 | Sakuragi ............. | H04N 5/3658 |
| | | | 327/50 |
| 2015/0109504 A1 | 4/2015 | Sakuragi | |

(Continued)

OTHER PUBLICATIONS

U.S. Appl. No. 15/227,576, filed Aug. 3, 2016.
U.S. Appl. No. 15/258,805, filed Sep. 7, 2016.

*Primary Examiner* — Twyler L Haskins
*Assistant Examiner* — Dwight Alex C Tejano
(74) *Attorney, Agent, or Firm* — Venable LLP

(57) ABSTRACT

Image sensor has pixel including photoelectric converter, pixel amplifier having input portion to receive signal from the photoelectric converter, and switch to connect reset terminal to the input portion. The sensor includes signal line to receive signal from the pixel amplifier, reset line connected to the reset terminal, and reset portion to reset voltage of the input portion. The reset portion includes capacitor to hold, in first period, second voltage appearing at the signal line in response to application of first voltage to the input portion, and supplier configured to set, in second period after the first period, the input portion to reset voltage via the switch by supplying third voltage corresponding to the second voltage held by the capacitor to the reset terminal via the reset line.

16 Claims, 8 Drawing Sheets

(56) References Cited

U.S. PATENT DOCUMENTS

| | | |
|---|---|---|
| 2015/0109505 A1 | 4/2015 | Sakuragi |
| 2015/0136952 A1* | 5/2015 | Kimura .................. H04N 5/363 250/208.1 |
| 2015/0326812 A1 | 11/2015 | Sakuragi |
| 2016/0014356 A1 | 1/2016 | Sakuragi |
| 2016/0037099 A1* | 2/2016 | Mandelli ................ H04N 5/363 348/241 |
| 2016/0150175 A1* | 5/2016 | Hynecek ............ H04N 5/37452 250/208.1 |
| 2016/0150176 A1 | 5/2016 | Hiyama et al. |
| 2017/0048475 A1 | 2/2017 | Sakuragi |

* cited by examiner

IMAGE SENSOR AND IMAGE SENSING APPARATUS

BACKGROUND OF THE INVENTION

Field of the Invention

The present invention relates to a solid-state image sensor and an image sensing apparatus.

Description of the Related Art

U.S. Pat. No. 6,777,660 discloses a CMOS solid-state image sensor having a function of reducing reset noise. The CMOS solid-state image sensor disclosed in U.S. Pat. No. 6,777,660 includes pixels and amplifiers. Each pixel includes a photodiode, a source follower, a reset transistor, and a selection transistor. A reset reference voltage is supplied to the non-inverting input terminal of each amplifier, the selection transistor is connected to the inverting input terminal, and the main electrode of the reset transistor is connected to the output terminal. When the photodiode is reset, reset noise is reduced by negatively feeding back the level output from the pixel via the selection transistor to the reset transistor via the amplifier.

In the arrangement disclosed in U.S. Pat. No. 6,777,660, a negative feedback circuit is constituted by the source follower, selection transistor, and reset transistor of a pixel and an amplifier arranged outside the pixel. With such an arrangement, the negative feedback circuit tends to undesirably oscillate. While the negative feedback circuit is oscillating, the photodiode cannot be reset to a desired voltage. In addition, even if the negative feedback circuit is designed to suppress oscillation, it takes much time to stabilize an output from the amplifier. While an output is unstable, the photodiode cannot be reset to a desired voltage. In particular, when such a circuit is required to read out signals at high speed, since the time allocated to resetting is short, the above problem becomes obvious.

SUMMARY OF THE INVENTION

The present invention provides a technique advantageous in preventing oscillation at the time of resetting.

One of aspects of the present invention provides a solid-state image sensor including a plurality of pixels, wherein the pixel includes a photoelectric converter, a pixel amplifier having an input portion to which a signal from the photoelectric converter is input, and a switch configured to connect a reset terminal to the input portion, the solid-state image sensor comprises a signal line to which a signal from the pixel amplifier is supplied, a reset line connected to the reset terminal, and a reset portion configured to reset a voltage of the input portion, the reset portion includes a capacitor configured to hold, in a first period, a second voltage appearing at the signal line in response to application of a first voltage to the input portion, and a supplier configured to set, in a second period after the first period, the input portion to a reset voltage via the switch by supplying a third voltage corresponding to the second voltage held by the capacitor to the reset terminal via the reset line, and in the first period, the input portion is disconnected from the supplier while the signal line is connected to the capacitor, and in the second period, the signal line is disconnected from the capacitor while the input portion is connected to the supplier.

Further features of the present invention will become apparent from the following description of exemplary embodiments with reference to the attached drawings.

DESCRIPTION OF THE EMBODIMENTS

The present invention will be described below through exemplary embodiments with reference to the accompanying drawings.

Figures 8, 9:
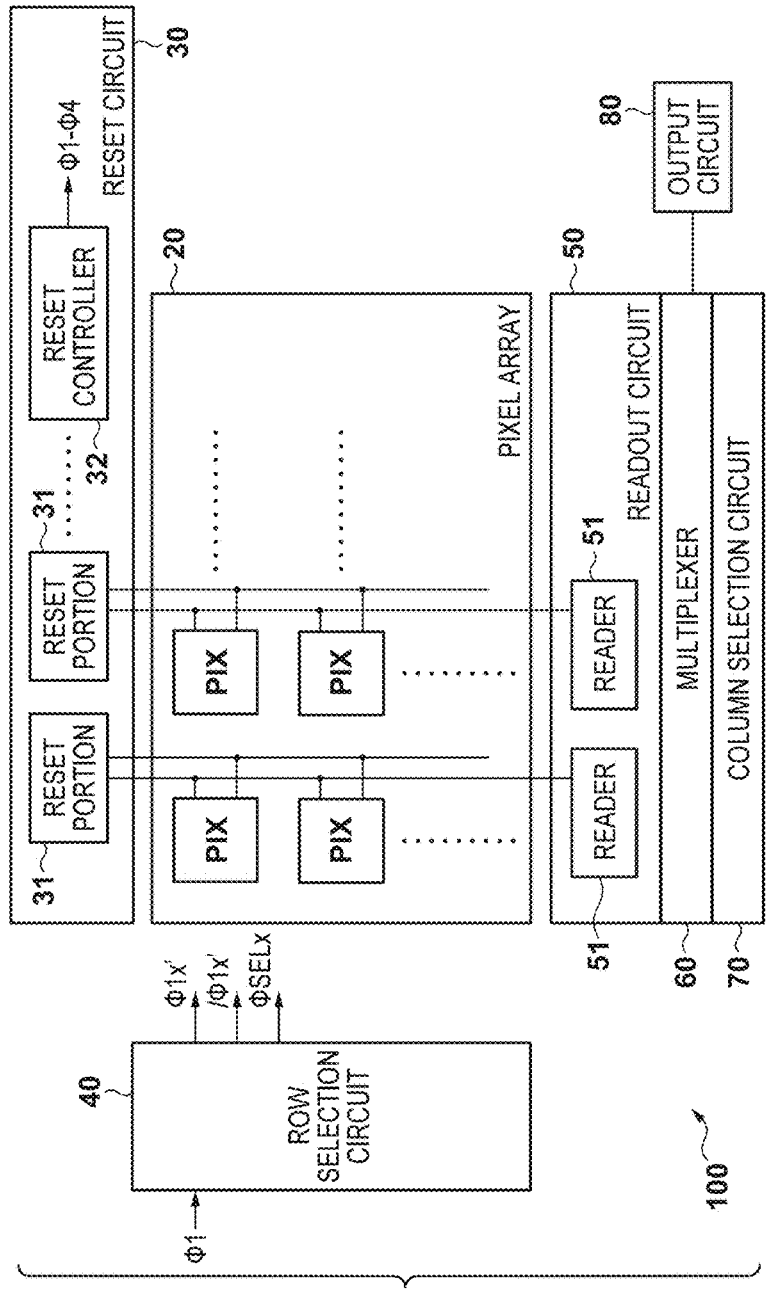
FIG. 8 is a block diagram showing the operation of a solid-state image sensor according to one embodiment of the present invention.
FIG. 9 is a view showing the operation of a solid-state image sensor according to one embodiment of the present invention.

FIG. 8 shows the arrangement of a solid-state image sensor 100 according to one embodiment of the present invention. The solid-state image sensor 100 can include a pixel array 20, a reset circuit 30, a row selection circuit 40, a readout circuit 50, a multiplexer 60, a column selection circuit 70, and an output circuit 80. The pixel array 20 is formed by arraying a plurality of pixels PIX so as to form a plurality of rows and a plurality of columns. A row direction is a direction parallel to the rows of the pixel array 20, and a column direction is a direction parallel to the columns of the pixel array 20. The solid-state image sensor 100 includes a plurality of signal lines 6 and a plurality of reset lines 14 (not shown in FIG. 8). The plurality of signal lines 6 and the plurality of reset lines 14 are arranged to cross the pixel array 20 in the column direction. One signal line 6 (not shown in FIG. 8) and one reset line 14 are arranged for each column of the pixel array 20.

The reset circuit 30 can include a plurality of reset portions 31 and a reset controller 32. Each reset portion 31 resets the voltage of the photoelectric converter of the pixel PIX, of the plurality of pixels PIX on the corresponding column, which is selected by the row selection circuit 40. One reset portion 31 is provided for each column of the pixel array 20. The reset controller 32 generates control pulses $\phi 1$, $/\phi 1$, $\phi 2$, $\phi 3$, $\phi 4$, and $/\phi 4$. The pulse $/\phi 1$ is an inversion signal obtained by inverting the pulse $\phi 1$.

The row selection circuit 40 selects a row of the pixel array 20, and controls each pixel PIX on the selected row. More specifically, the row selection circuit 40 activates a selection signal $\phi SEL_x$ (x=1 to n) for a row selected from a plurality of rows 1 to n of the pixel array 20. In addition, upon receiving $\phi 1$ and $/\phi 1$ generated by the reset controller 32 of the reset circuit 30, the row selection circuit 40 outputs φ1'x and /φ1'x having the same logic as that of φ1 and /φ1 to a row selected from the plurality of rows 1 to n. Alternatively, upon receiving φ1 generated by the reset controller 32 of the reset circuit 30, the row selection circuit 40 outputs φ1'x having the same logic as that of φ1 and /φ1'x obtained by inverting φ1'x to a row selected from the plurality of rows 1 to n. Note that φ1'x is the logical AND between φ1 and φSELx, and /φ1'x is, for example, the logical AND between 41 and φSELx. In the following description, when describing the arrangement and driving of each pixel PIX, for the sake of simplicity, φSELx, φ1'x, and /φ1'x are written as φSEL, φ1', and /φ1'.

The readout circuit 50 can include a plurality of readers 51. One reader 51 is provided for each column of the pixel array 20. Each reader 51 reads out a signal from the pixel PIX, of the plurality of pixels PIX on the corresponding column, which is selected by the row selection circuit 40 via the signal line 6. In this case, each reader 51 can be configured to read out a signal (first signal) from the pixel PIX at the time of elapse of an accumulation time during which the photoelectric converter of the pixel PIX photoelectrically converts incident light, and read out a signal (second signal) from the pixel PIX immediately after the voltage of the photoelectric converter of the pixel PIX is reset. Each reader 51 can be configured to output the difference between the first and second signals as a pixel signal. Such an operation is called CDS (Correlated Double Sampling).

The column selection circuit 70 selects a column of the pixel array 20. The multiplexer 60 selects a signal output from the reader 51, of the plurality of readers 51 of the readout circuit 50, which corresponds to the column selected by the column selection circuit 70, and outputs the selected signal to the output circuit 80. The output circuit 80 amplifies and outputs the signal output from the multiplexer 60. In this case, the CDS described above may be implemented by the output circuit 80. In this case, each reader 51 can output the first and second signals, and the output circuit 80 can compute the difference between the first and second signals.

As shown in FIG. 9, one cycle of driving of each row of the pixel array 20 of the solid-state image sensor 100 can include a first reset operation period P1, an accumulation period P2, a first readout period P3, a second reset operation period P4, and a second readout period P5. A plurality of rows of the pixel array 20 can be driven by a rolling shutter scheme.

Figure 1:
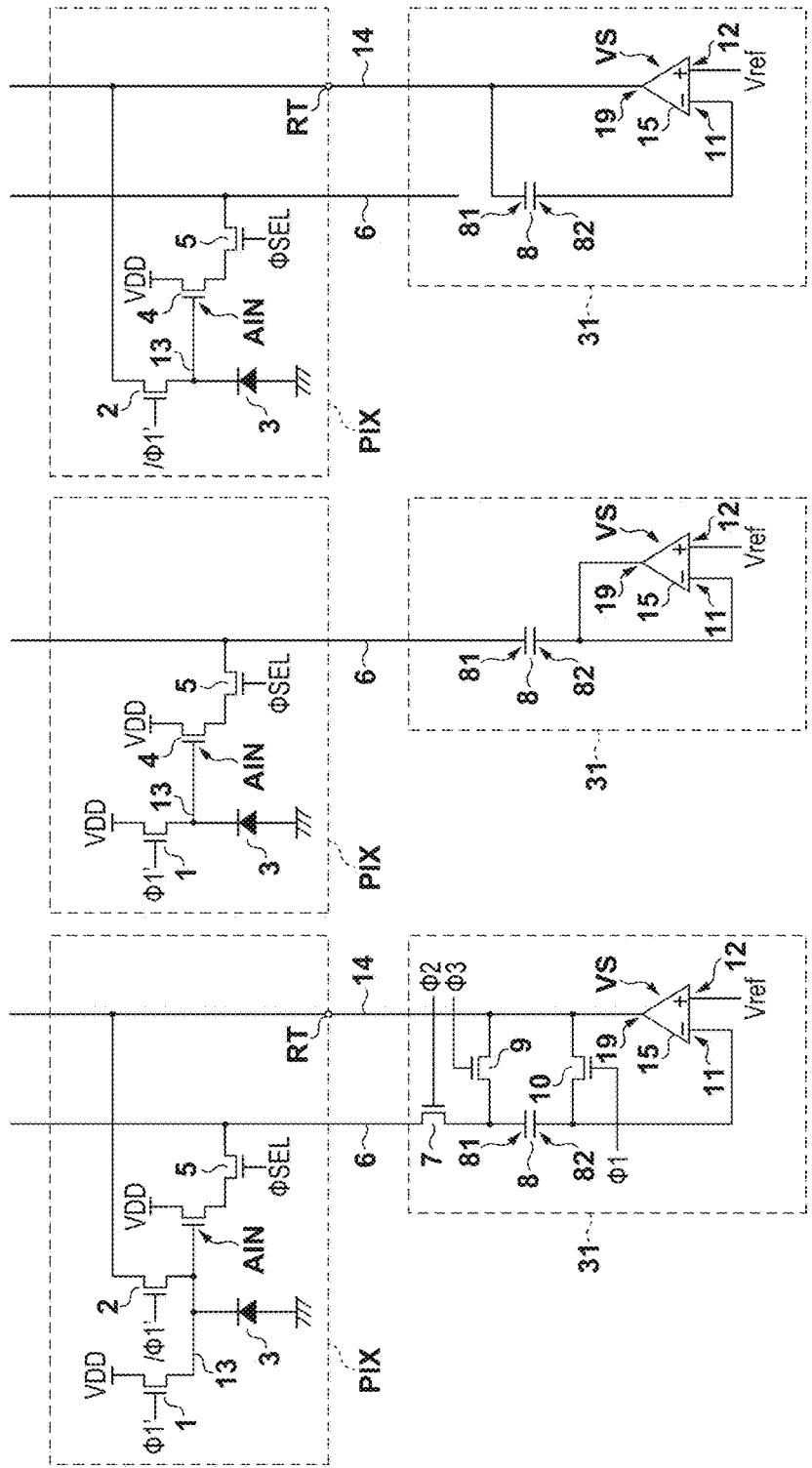
FIGS. 1A to 1C are circuit diagrams showing the arrangements of each pixel and each reset portion according to the first embodiment of the present invention.
Figure 2:
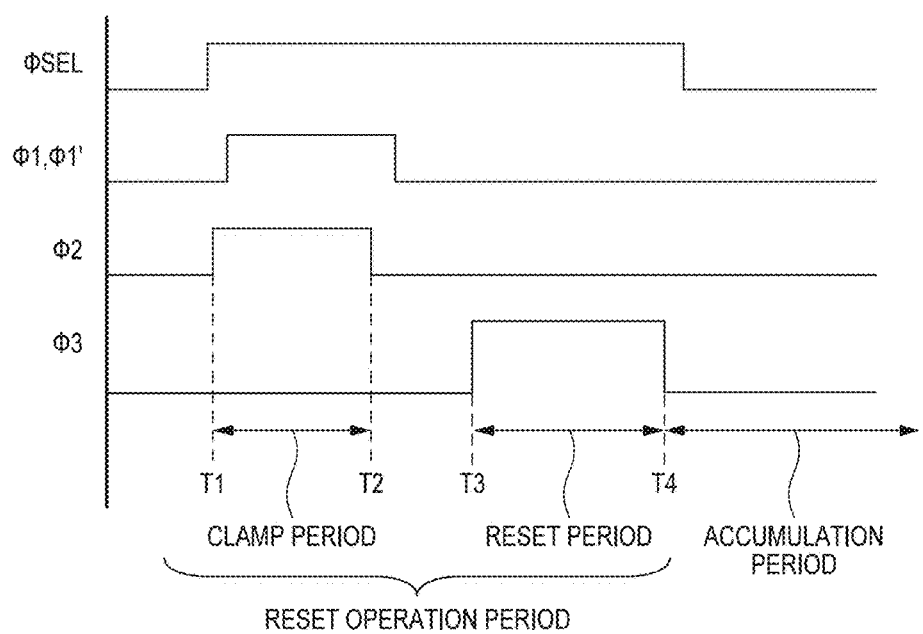
FIG. 2 is a timing chart showing a method of driving each pixel according to the first and fourth embodiments of the present invention.

FIG. 1A shows the arrangement of each pixel PIX and each reset portion 31 according to the first embodiment. FIG. 2 shows a method of driving the arrangement shown in FIG. 1A. Each pixel PIX includes a photoelectric converter (for example, a photodiode) 3, a pixel amplifier 4, a switch 2, a selector 5, a voltage supplier 1, and a common node 13. The common node 13 is also called a floating diffusion, and functions as a capacitor which holds charges. A voltage corresponding to the charges generated by the photoelectric converter 3 appears at the common node 13. The pixel amplifier 4 includes an input portion AIN to which a signal from the photoelectric converter 3 is input. More specifically, the pixel amplifier 4 can be implemented by a MOS transistor whose gate as the input portion AIN is connected to the common node 13. A power supply voltage VDD is supplied to the drain (or source) of the MOS transistor implementing the pixel amplifier 4. The source (or drain) can be connected to the selector 5. A current source (not shown) is connected to the signal line 6. The pixel amplifier 4 operates as a source follower.

The selector 5 connects the pixel amplifier 4 to the signal line 6 in response to the activation of a selection signal SEL (selection of a row). The selector 5 can be implemented by a MOS transistor having a gate to which the selection signal SEL is supplied. The selector 5 is a constituent element which can be omitted. In an arrangement without the selector 5, the selection/non-selection of the pixel PIX can be controlled by controlling the bias of the pixel amplifier 4. For example, the power supply voltage VDD is supplied to the drain of the pixel amplifier 4 of each pixel PIX on a row to be selected, and a voltage (for example, 0 V) which does not turn on the pixel amplifier 4 is supplied to the drain of the pixel amplifier 4 of each pixel PIX on a row which is not selected.

Each switch 2 connects a reset terminal RT to the common node 13 (the input portion AIN of the pixel amplifier 4) in response to the activation of the control signal /φ1'. The switch 2 can be implemented by a MOS transistor whose gate is connected to the control signal /φ1'. The reset line 14 is connected to the reset terminal RT. The voltage supplier 1 supplies a first voltage (power supply voltage VDD) to the common node 13 (input portion AIN). The voltage supplier 1 can be implemented by a switch which connects the power supply voltage VDD to the common node 13 in response to the activation of the control signal /φ1'. A voltage at the time of activation of the control signals φ1'x and /φ1'x is sufficiently higher than a power supply voltage VDD+Vth, where Vth is the threshold voltage of the MOS transistors respectively implementing the switch 2, the voltage supplier 1, the pixel amplifier 4, and the selector 5.

Each reset portion 31 can include a capacitor (clamp capacitor) 8 and a supplier VS. The capacitor 8 includes a first terminal 81 and a second terminal 82. The supplier VS can include a differential amplifier 15. The differential amplifier 15 includes an inverting input terminal (first input terminal) 11, a non-inverting input terminal (second input terminal) 12, and an output terminal 19. A reference voltage Vref is supplied to the non-inverting input terminal 12. The supplier VS supplies a voltage for resetting to the reset terminal RT of the pixel PIX via the reset line 14. The supplier VS can include switches 7, 9, and 10. The switch 7 is controlled by a control signal φ2. The switch 9 is controlled by a control signal φ3. The switch 10 is controlled by the control signal φ1. The switch 7 is arranged in series with the signal line 6. That is, the switch 7 is arranged to be able to connect or disconnect the signal line 6 to or from the capacitor 8. The switch 9 is arranged to be able to connect or disconnect the output terminal 19 of the differential amplifier 15 to or from the first terminal 81 of the capacitor 8. The switch 10 is arranged to connect or disconnect the output terminal 19 of the differential amplifier 15 to or from the second terminal 82 of the capacitor 8.

Referring to FIG. 2, the time interval between time T1 and time T2 is a clamp period (first period), and the time interval between time T3 and time T4 after the clamp period is a reset period (second period). The time interval between time T1 and time T4, that is, a period including the clamp period and the reset period, is called a reset operation period. An accumulation period can start following the reset operation period. Although not shown in FIG. 2, a readout period during which the readout circuit 50 reads out a first signal from the pixel PIX in FIG. 2, a readout period during which the readout circuit 50 reads out a first signal from the pixel PIX following the accumulation period. In addition, after the readout period, a readout period for reading out a second signal may be provided after a reset operation period. The selection signal φSEL is activated in a reset operation period and a readout period.

An operation in a clamp period (T1 to T2) will be described with reference to FIG. 1B. While the selection signal φSEL is at high level (active level), the control signals φ1, φ1', and φ2 are set at high level (active level), and the voltage supplier 1 and the switches 7 and 10 are turned on. In contrast, the switch 2 to which the inversion signal /φ1' of the control signal φ1' is supplied is OFF. Since the voltage supplier 1 is ON, the voltage of the common node 13 (input portion AIN) is equal to the power supply voltage VDD. Since the pixel amplifier 4 operates as a source follower, the voltage of the signal line 6 is the voltage (VDD−Vth) obtained by subtracting a threshold voltage Vth of the pixel amplifier 4 from the power supply voltage VDD of the common node 13. Since the switch 7 is also ON, the voltage of the first terminal 81 of the capacitor 8 also becomes (VDD−Vth).

In addition, since the switch 10 is ON, the inverting input terminal 11 is connected to the output terminal 19, and the differential amplifier 15 operates as a voltage follower. The voltage of the inverting input terminal 11 is a voltage (Vref+Voff) obtained by adding an input offset voltage Voff of the differential amplifier 15 to a reference voltage Vref applied to the non-inverting input terminal 12.

Therefore, the voltage between the first terminal 81 and the second terminal 82 of the capacitor 8 is the voltage represented by $$(VDD-Vth)-(Vref+Voff) \quad (1)$$

An operation in a reset period (T3 to T4) will be described with reference to FIG. 1C. While the selection signal φSEL is kept at high level (active level), the control signals φ1, φ1', and φ2 are set at low level, and the control signal φ3 shifts to high level. Therefore, the voltage supplier 1 and the switches 7 and 10 are turned off, and the switches 2 and 9 are turned on. Since the capacitor 8 holds charges corresponding to the voltage between the first terminal 81 and the second terminal 82 (the voltage represented by expression (1)) in a clamp period, the voltage between the first terminal 81 and the second terminal 82 is kept at the voltage represented by expression (1).

Therefore, the voltage of the reset line 14 becomes the voltage represented by equation (2). It is obvious from equation (2) that the input offset voltage Voff is canceled.

$$Vref+Voff+\{(VDD-Vth)-(Vref+Voff)\}=VDD-Vth \quad (2)$$

Since the switch 2 is ON, the voltage of the common node 13 (input portion AIN) also becomes equal to the voltage represented by equation (2). That is, the common node 13 (input portion AIN) is reset to the voltage represented by equation (2). The voltage of the signal line 6 in this state, that is, in the reset state, is the voltage obtained by subtracting the threshold voltage Vth of the pixel amplifier 4 from the voltage of the common node 13, and hence is represented by $$(VDD+Vth)-Vth=VDD-2\times Vth \quad (3)$$

Either the voltage of the common node 13 at the reset time represented by equation (2) (that is, the reset voltage) or the voltage of the signal line 6 at the reset time represented by equation (3) does not include the input offset voltage Voff which is a variation element. Therefore, the reset voltage is free from the influence of variation in the input offset voltages Voff of the differential amplifiers 15 between columns.

The above operation is summarized as follows. In a clamp period (first period), the capacitor 8 of the reset portion 31 holds the second voltage (VDD−Vth) appearing at the signal line 6 in response to the application of the first voltage (VDD) to the common node 13 (input portion AIN). In a reset period (second period) after the clamp period (first period), the supplier VS supplies a third voltage (VDD−Vth) corresponding to the second voltage (VDD−Vth) held by the capacitor 8 to the reset terminal RT via the reset line 14. This sets the common node 13 to the reset voltage (VDD−Vth) via the switch 2.

In the first embodiment, in a clamp period (first period), the signal line 6 is connected to the capacitor 8 by the switch 7, and the common node 13 (input portion AIN) is disconnected from the supplier VS by the switch 2. In a reset period (second period), the common node 13 (input portion AIN) is connected to the supplier VS by the switch 2, and the signal line 6 is disconnected from the capacitor 8 by the switch 7. Therefore, in a reset operation period including a clamp period and a reset period, the pixel PIX and the reset portion 31 do not form a negative feedback circuit. This therefore prevents the occurrence of oscillation in the reset operation period.

The above discussion also holds for random noise in a given low frequency range. It is therefore possible to set voltages at the common node 13 (input portion AIN) and the signal line 6 while reducing random noise generated by the pixel amplifier 4, the selector 5, and the differential amplifier 15.

The above low frequency noise reducing effect depends on the time difference (T4−T2) between time T2 and time T4 in the timing chart of FIG. 2, and a transfer function is represented by $$|2\times SIN\{(\pi\times f\times(T4-T2))\}| \quad (4)$$

Figure 3:
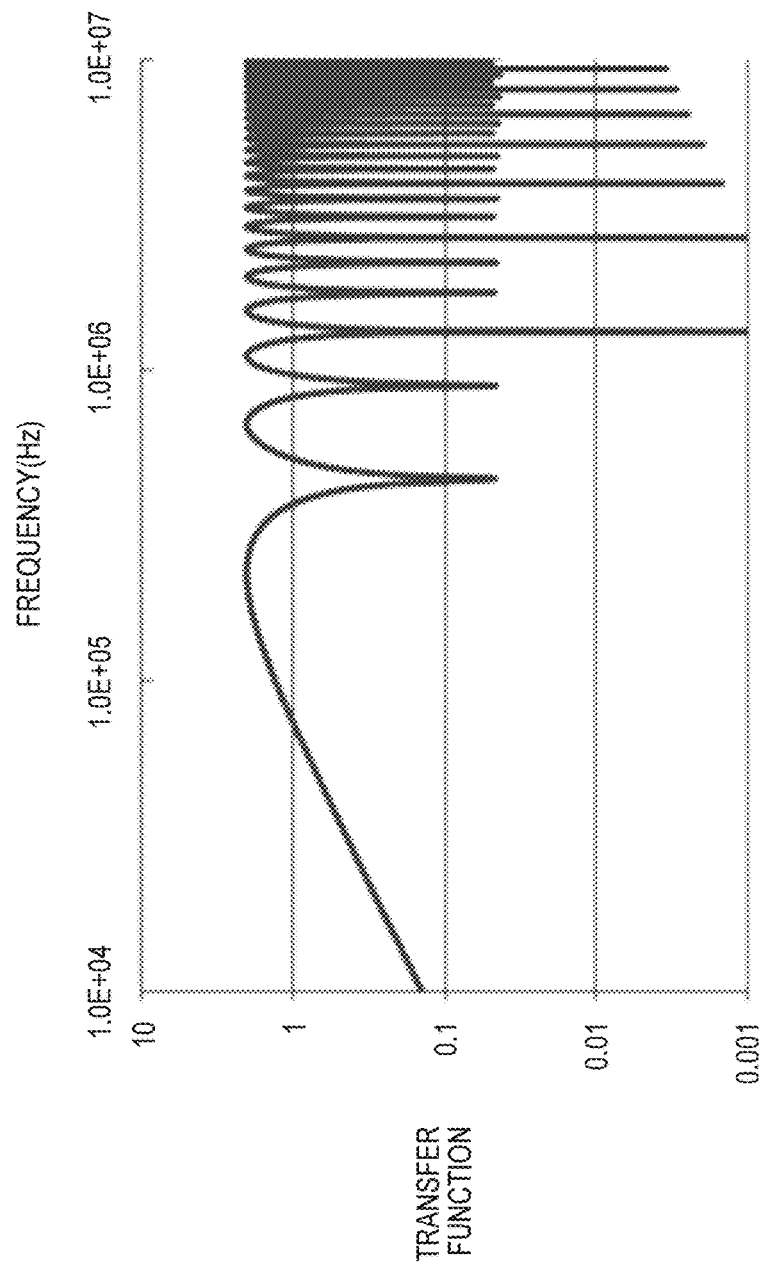
FIG. 3 is a graph showing a transfer function for signals according to the first embodiment of the present invention.

FIG. 3 is a graph based on expression (4). As is obvious from FIG. 3, since the transfer function is low at low frequencies, the low frequency components of random noise are suppressed.

Figure 4:
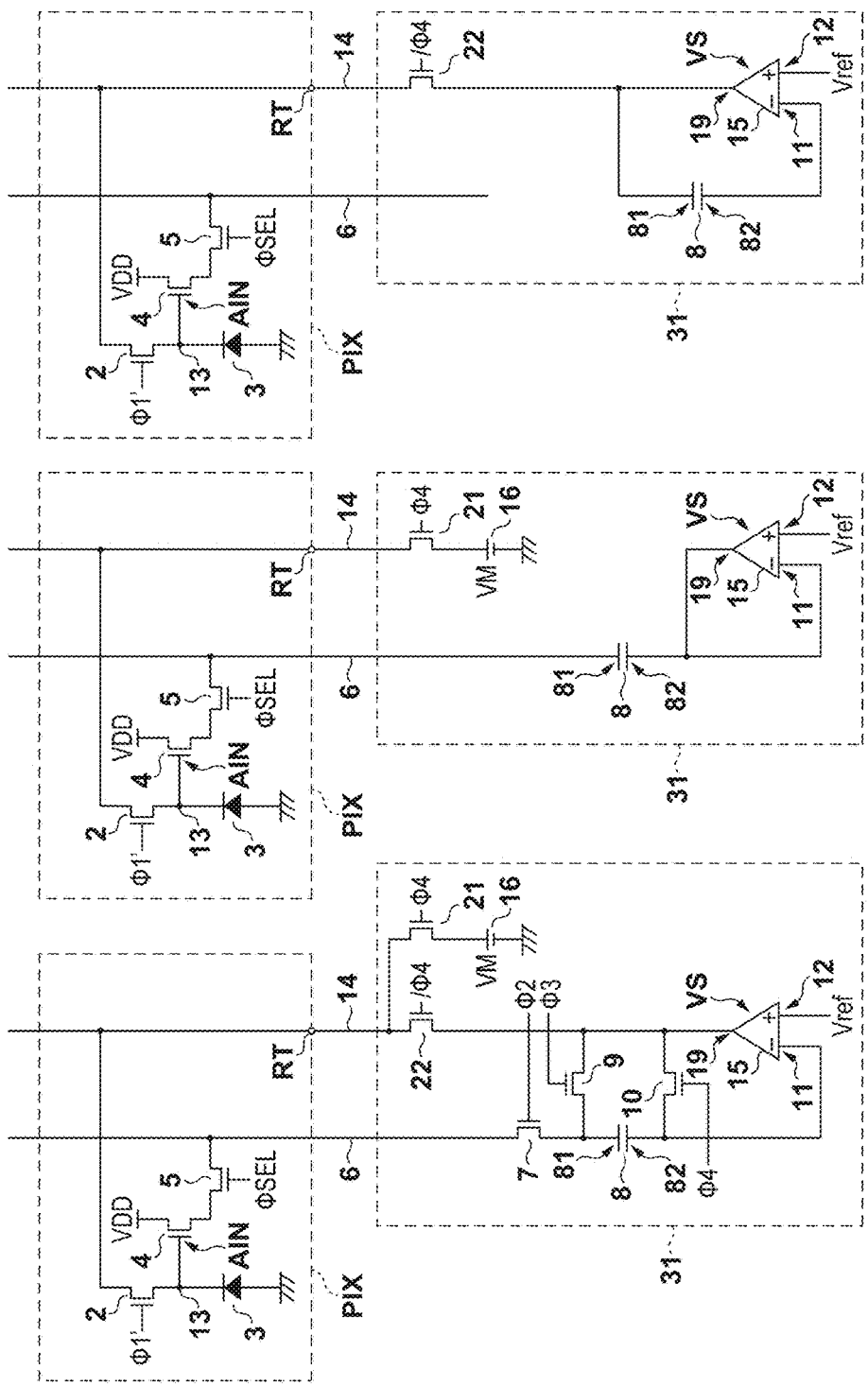
FIGS. 4A to 4C are circuit diagrams showing the arrangements of each pixel and each reset portion according to the second embodiment of the present invention.
Figure 5:
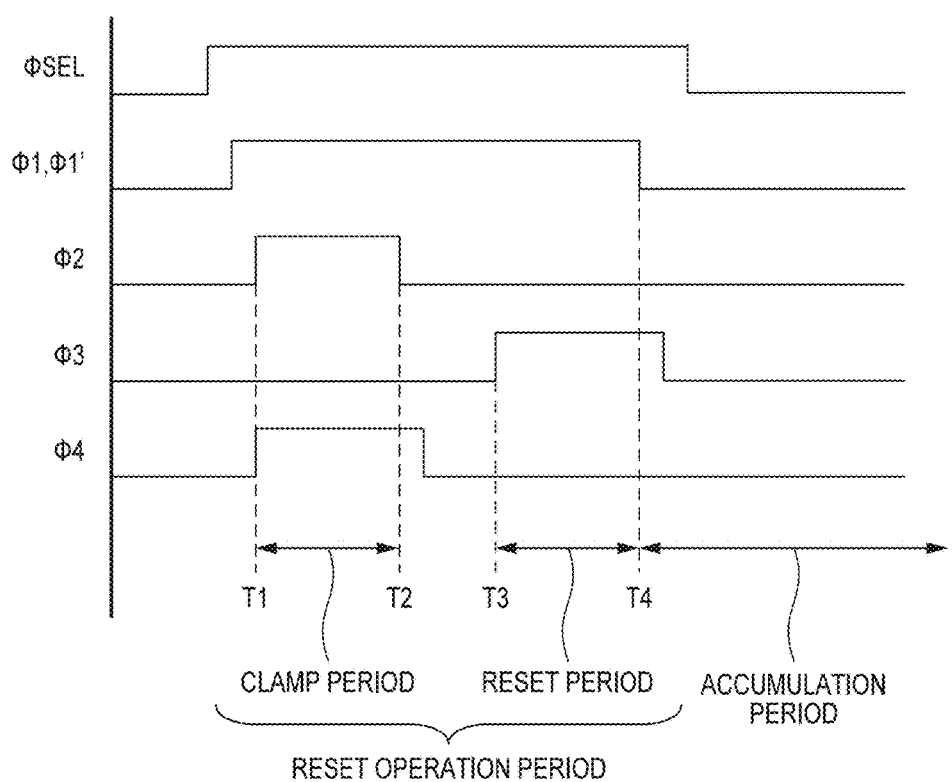
FIG. 5 is a timing chart showing a method of driving each pixel according to the second embodiment of the present invention.

FIG. 4A shows the arrangements of each pixel PIX and each reset portion 31 according to the second embodiment. FIG. 5 shows a method of driving the arrangement shown in FIG. 4A. Particulars that are not mentioned in the second embodiment can comply with the first embodiment. In the second embodiment, an arrangement corresponding to the voltage supplier 1 according to the first embodiment is not arranged in each pixel PIX but is arranged in each reset portion 31. In the second embodiment, a voltage supplier 1 need not be provided for each pixel PIX. Control signals φ1, φ1', φ2, and φ3 are driven differently from those in the first embodiment, and control signals φ4 and /φ4 are added. The control signal φ1 is supplied to a switch 2.

A supplier 51 includes a switch 22, a voltage supplier 21, and a power supply 16 in addition to switches 7, 9, and 10. The voltage supplier 21 is arranged to be able to connect or disconnect a reset line 14 to or from the power supply 16. The switch 22 is arranged to be able to connect or disconnect the reset line 14 to or from a supplier VS.

Referring to FIG. 5, the time interval between time T1 and time T2 is a clamp period (first period), and the time interval between time T3 and time T4 after the clamp period is a reset period (second period). The time interval between time T1 and time T4, that is, a period including the clamp period and the reset period, is called a reset operation period. An accumulation period can start following the reset operation period. Although not shown in FIG. 5, a readout period during which a readout circuit 50 reads out a first signal from the pixel PIX can follow the accumulation period. In addition, after the readout period, a readout period for reading out a second signal may be provided after a reset operation period. A selection signal φSEL is activated in a reset operation period and a readout period.

An operation in a clamp period (T1 to T2) will be described with reference to FIG. 4B. While the selection signal φSEL is at high level (active level), the control signals φ1, φ2, and φ4 are set at high level (active level), and the voltage supplier 1 and the switches 7 and 10 are turned on. In contrast, the switch 22 to which the control signal φ4 is supplied is OFF. Since the voltage supplier 21 is ON, the voltage of a common node 13 (input portion AIN) is equal to a voltage VM supplied from the power supply 16. Since a pixel amplifier 4 operates as a source follower, the voltage of a signal line 6 is a voltage (VM−Vth) obtained by subtracting a threshold voltage Vth of the pixel amplifier 4 from the voltage VM of the common node 13. Since the switch 7 is also ON, the voltage of a first terminal 81 of a capacitor 8 also becomes (VM−Vth).

In addition, since the switch 10 is ON, an inverting input terminal 11 is connected to an output terminal 19, and a differential amplifier 15 operates as a voltage follower. The voltage of the inverting input terminal 11 is a voltage (Vref+Voff) obtained by adding an input offset voltage Voff of the differential amplifier 15 to a reference voltage Vref applied to a non-inverting input terminal 12.

Therefore, the voltage between the first terminal 81 and a second terminal 82 of the capacitor 8 is the voltage represented by $$(VM-Vth)-(Vref+Voff) \quad (5)$$

An operation in a reset period (T3 to T4) will be described with reference to FIG. 4C. While the selection signal φSEL is kept at high level (active level), the control signals φ2 and φ4 are set at low level, and the control signal φ3 shifts to high level. Therefore, the voltage supplier 21 and the switches 7 and 10 are turned off, and the switches 22 and 9 are turned on. Since the capacitor 8 holds charges corresponding to the voltage between the first terminal 81 and the second terminal 82 (the voltage represented by expression (5)) in a clamp period, the voltage between the first terminal 81 and the second terminal 82 is kept at the voltage represented by expression (5).

Therefore, the voltage of the reset line 14 becomes the voltage represented by equation (6). It is obvious from equation (6) that the input offset voltage Voff is canceled.

$$Vref+Voff+\{(VM-Vth)-(Vref+Voff)\}=VM-Vth \quad (6)$$

Since the switch 2 is ON, the voltage of the common node 13 (input portion AIN) also becomes equal to the voltage represented by equation (6). That is, the common node 13 (input portion AIN) is reset to the voltage represented by equation (6). The voltage of the signal line 6 in this state, that is, in the reset state, is the voltage obtained by subtracting the threshold voltage Vth of the pixel amplifier 4 from the voltage of the common node 13, and hence is represented by $$(VM+Vth)-Vth=VM-2\times Vth \quad (7)$$

Either the voltage of the common node 13 at the reset time represented by equation (6) (that is, the reset voltage) or the voltage of the signal line 6 at the reset time represented by equation (7) does not include the voltage Voff which is a variation element. Therefore, the reset voltage is free from the influence of variation in the input offset voltage Voff of the differential amplifiers 15 between columns.

The above operation is summarized as follows. In a clamp period (first period), the capacitor 8 of the reset portion 31 holds the second voltage (VM−Vth) appearing at the signal line 6 in response to the application of the first voltage (VM) to the common node 13 (input portion AIN). In a reset period (second period) after the clamp period (first period), the supplier VS supplies a third voltage (VM−Vth) corresponding to the second voltage (VM−Vth) held by the capacitor 8 to the reset terminal RT via the reset line 14. This sets the common node 13 to the reset voltage (VM−Vth) via the switch 2.

In the second embodiment, in a clamp period (first period), the signal line 6 is connected to the capacitor 8 by the switch 7, and the common node 13 (input portion AIN) is disconnected from the supplier VS by the switch 2. In a reset period (second period), the common node 13 (input portion AIN) is connected to the supplier VS by the switches 2 and 22, and the signal line 6 is disconnected from the capacitor 8 by the switch 7. Therefore, in a reset operation period including a clamp period and a reset period, the pixel PIX and the reset portion 31 do not form a negative feedback circuit. This therefore prevents the occurrence of oscillation in the reset operation period. The second embodiment also has a low frequency noise reducing effect similar to that in the first embodiment.

Figure 6:
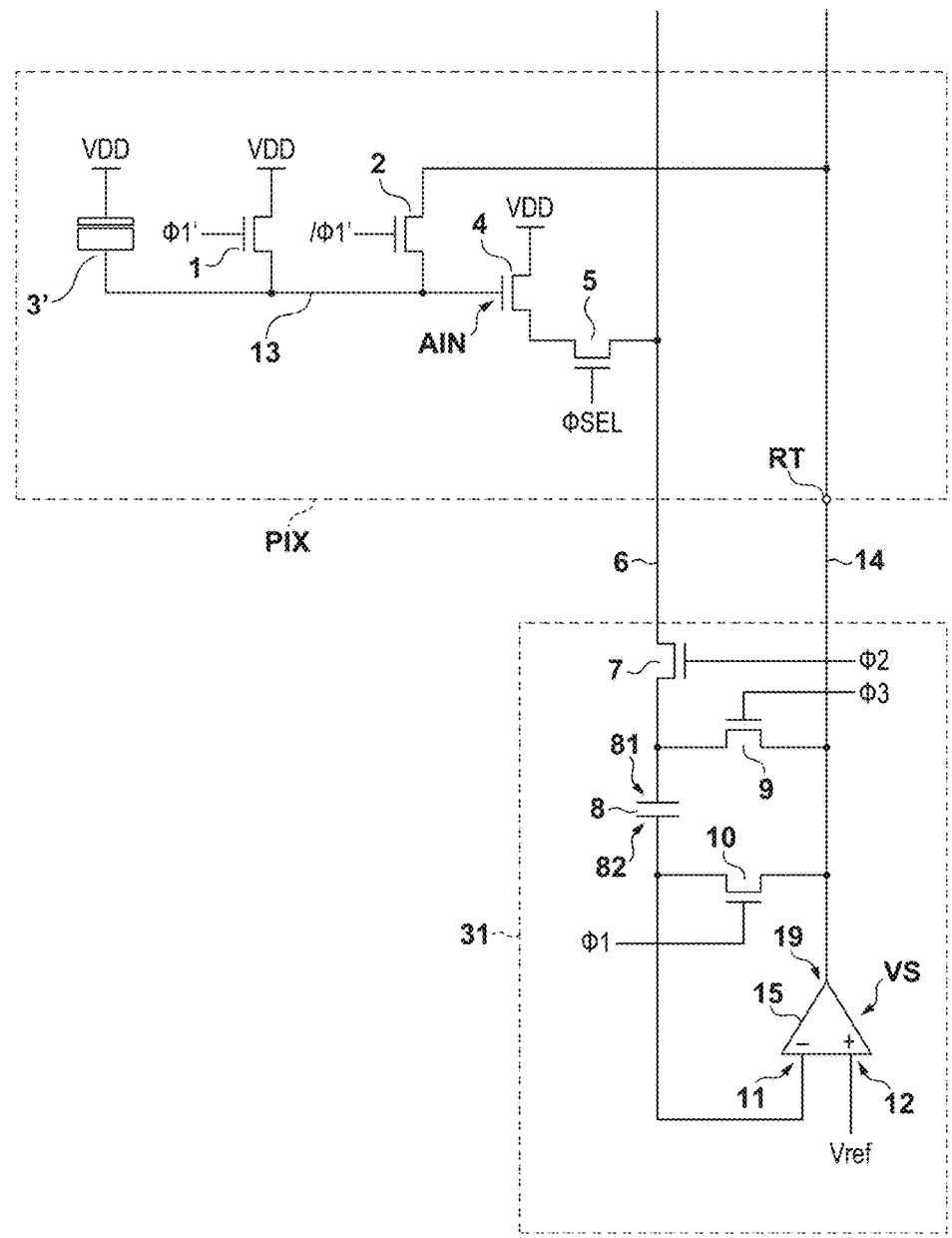
FIG. 6 is a circuit diagram showing the arrangement of a pixel reset circuit according to the third embodiment of the present invention.

FIG. 6 shows the arrangements of each pixel PIX and each reset portion 31 according to the third embodiment. In the third embodiment, each photoelectric converter 3 in the first embodiment is replaced by a photoelectric conversion film (photoelectric converter) 3'. The photoelectric conversion film 3' supplies a current corresponding to incident light to a common node 13. An operation in the third embodiment is the same as that in the first embodiment. Each selector 5 can be omitted. In this case, the selection/non-selection of each pixel PIX can be controlled by controlling the bias of a pixel amplifier 4. For example, a power supply voltage VDD is supplied to the drain of the pixel amplifier 4 of each pixel PIX on a row to be selected, and a voltage (for example, 0 V) which does not turn on the pixel amplifier 4 is supplied to the drain of the pixel amplifier 4 of each pixel PIX on a row which is not selected.

Figure 7:
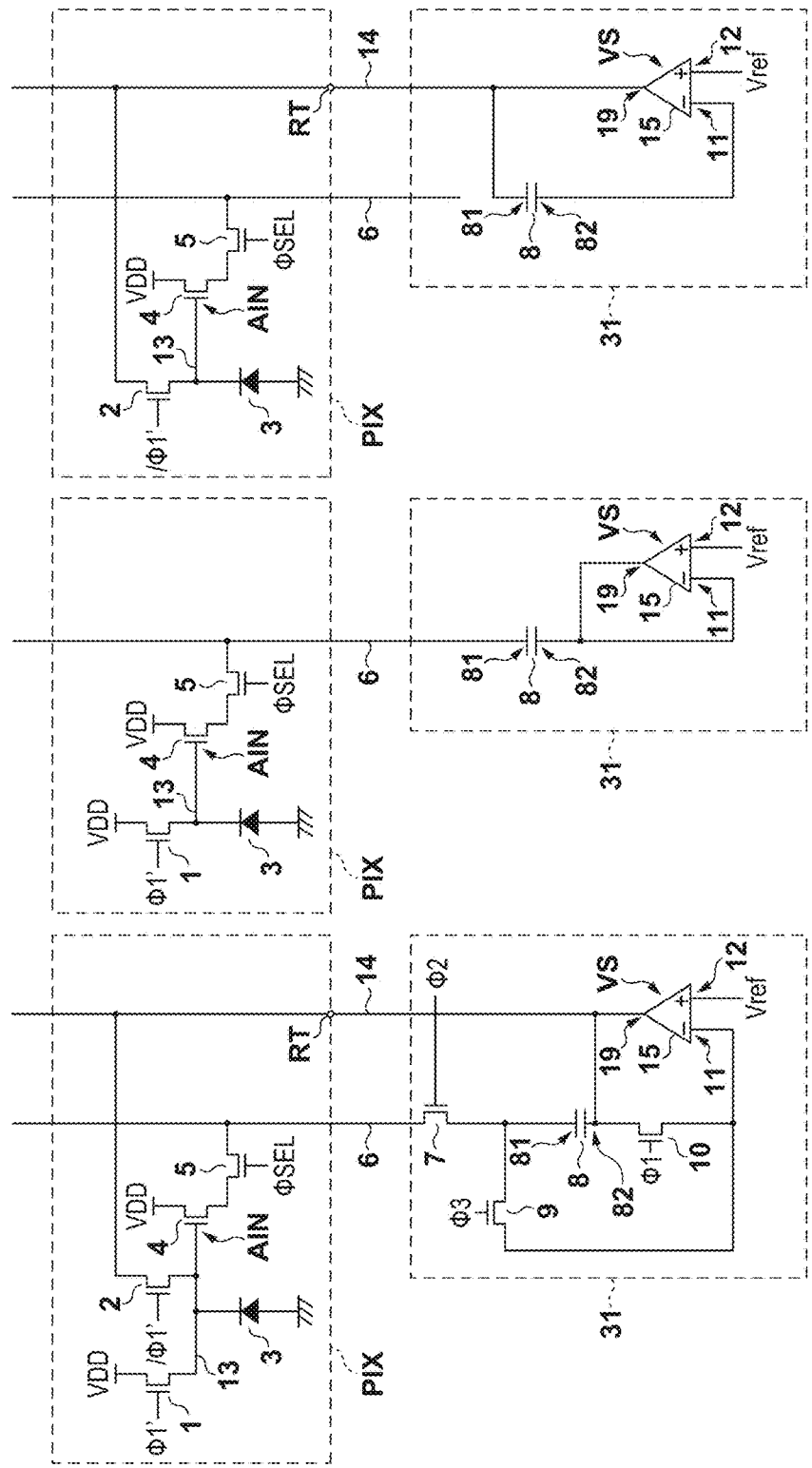
FIGS. 7A to 7C are circuit diagrams showing the arrangements of each pixel and each reset portion according to the fourth embodiment of the present invention.

FIG. 7A shows the arrangements of each pixel PIX and each reset portion 31 according to the fourth embodiment. FIG. 2 shows a method of driving the arrangement shown in FIG. 7A. Particulars that are not mentioned in the fourth embodiment can comply with the first embodiment. In the fourth embodiment, the arrangement of switches 7, 9, and 10 differs from that in the first embodiment. The switches 9 and 10 are arranged so as to selectively connect an inverting input terminal (first input terminal) 11 of a differential amplifier 15 to one of first and second terminals 81 and 82 of a capacitor 8. The switch 7 is arranged to be able to connect or disconnect a signal line 6 to or from a supplier VS. The switch 7 is controlled by a control signal φ2. The switch 9 is controlled by a control signal φ3. The switch 10 is controlled by a control signal φ1.

As in the first embodiment, the time interval between time T1 and time T2 is a clamp period (first period), and the time interval between time T3 and time T4 after the clamp period is a reset period (second period). The time interval between time T1 and time T4, that is, a period including the clamp period and the reset period, is called a reset operation period. An accumulation period can start following the reset operation period. A readout period during which a readout circuit 50 reads out a first signal from the pixel PIX can follow the accumulation period. In addition, after the readout period, a readout period for reading out a second signal may be provided following a reset operation period. A selection signal φSEL is activated in a reset operation period and a readout period.

An operation in a clamp period (T1 to T2) will be described with reference to FIG. 7B. While the selection signal φSEL is at high level (active level), the control signals φ1, φ1', and φ2 are set at high level (active level), and the voltage supplier 1 and the switches 7 and 10 are turned on. In contrast, the switch 2 to which an inversion signal /φ1' of the control signal φ1' is supplied is OFF. Since a voltage supplier 1 is ON, the voltage of a common node 13 (input portion AIN) is equal to the power supply voltage VDD. Since the pixel amplifier 4 operates as a source follower, the voltage of the signal line 6 is a voltage (VDD−Vth) obtained by subtracting a threshold voltage Vth of the pixel amplifier 4 from the power supply voltage VDD of the common node 13. Since the switch 7 is also ON, the voltage of the first terminal 81 of the capacitor 8 also becomes (VDD−Vth).

In addition, since the switch 10 is also ON, the inverting input terminal 11 is connected to the output terminal 19, and the differential amplifier 15 operates as a voltage follower. The voltage of the inverting input terminal 11 is a voltage (Vref+Voff) obtained by adding an input offset voltage Voff of the differential amplifier 15 to a reference voltage Vref applied to a non-inverting input terminal 12.

Therefore, the voltage between the first terminal 81 and the second terminal 82 of the capacitor 8 is the voltage represented by $$(VDD-Vth)-(Vref+Voff) \quad (8)$$

An operation in a reset period (T3 to T4) will be described with reference to FIG. 7C. While the selection signal φSEL is kept at high level (active level), the control signals φ1, φ1', and φ2 are set at low level, and the control signal φ3 shifts to high level. Therefore, the voltage supplier 1 and the switches 7 and 10 are turned off, and the switches 2 and 9 are turned on. The first terminal 81 of the capacitor 8 is connected to the inverting input terminal (first input terminal) 11 of the differential amplifier 15. The second terminal 82 of the capacitor 8 is connected to the non-inverting input terminal (second input terminal) 12 of the differential amplifier 15. This point differs from that in the first embodiment.

Since the capacitor 8 holds charges corresponding to the voltage between the first terminal 81 and the second terminal 82 (the voltage represented by expression (8)) in a clamp period, the voltage between the first terminal 81 and the second terminal 82 is kept at the voltage represented by expression (8).

Therefore, the voltage of the reset line 14 becomes the voltage represented by equation (9).

$$Vref+Voff-\{(VDD-Vth)-(Vref+Voff)\}=2\times(Vref+Voff)-(VDD-Vth) \quad (9)$$

Since the switch 2 is ON, the voltage of the common node 13 (input portion AIN) also becomes equal to the voltage represented by equation (9). That is, the common node 13 (input portion AIN) is reset to the voltage represented by equation (9). The voltage of the signal line 6 in this state, that is, in the reset state, is the voltage obtained by subtracting the threshold voltage Vth of the pixel amplifier 4 from the voltage of the common node 13, and hence is represented by $$2\times(Vref+Voff)-(VDD-Vth)-Vth=2\times(Vref+Voff)-VDD \quad (10)$$

It is obvious from equation (10) that the threshold voltage Vth is canceled. That is, the voltage of the signal line 6 at the time of resetting which is indicated by equation (10) does not include the threshold voltage Vth as a variation element.

Therefore, the reset voltage is free from the influence of variation in the threshold voltage of the pixel amplifiers 4 between columns.

The above operation is summarized as follows. In a clamp period (first period), the capacitor 8 of the reset portion 31 holds the second voltage (VDD−Vth) appearing at the signal line 6 in response to the application of the first voltage (VDD) to the common node 13 (input portion AIN). In a reset period (second period) after the clamp period (first period), the supplier VS supplies a third voltage (2×(Vref+Voff)−(VDD−Vth)) corresponding to the second voltage (VDD−Vth) held by the capacitor 8 to the reset terminal RT via the reset line 14. This sets the common node 13 to the reset voltage (2×(Vref+Voff)−(VDD−Vth)) via the switch 2, and the signal line 6 is set to the reset voltage (2×(Vref+Voff)−VDD)

In the second embodiment, in a clamp period (first period), the signal line 6 is connected to the capacitor 8 by the switch 7, and the common node 13 (input portion AIN) is disconnected from the supplier VS by the switch 2. In a reset period (second period), the common node 13 (input portion AIN) is connected to the supplier VS by the switch 2, and the signal line 6 is disconnected from the capacitor 8 by the switch 7. Therefore, in a reset operation period including a clamp period and a reset period, the pixel PIX and the reset portion 31 do not form a negative feedback circuit. This therefore prevents the occurrence of oscillation in the reset operation period.

A noise reducing effect in a solid-state image sensor 100 according to the fourth embodiment will be verified here. Consider a case in which, as shown in FIG. 9, one cycle of driving of each row of a pixel array 20 includes a first reset operation period P1, an accumulation period P2, a first readout period P3, a second reset operation period P4, and a second readout period P5. At the end of the first reset operation period P1 including a clamp period and a reset period, the accumulation period P2 starts. In the first readout period P3, the readout circuit 50 reads out a first signal corresponding to the charges generated by photoelectric conversion in the accumulation period P2. Thereafter, in the second reset operation period P4 including a clamp period and a reset period, the voltage of the photoelectric converter 3 of the pixel PIX is reset. Subsequently, in the second readout period P5, the readout circuit 50 reads out, as a second signal, a signal immediately after the reset operation in the second reset operation period P4.

First of all, in a clamp period in the first reset operation period P1, the voltage of the common node 13 (input portion AIN) is set to VDD+N1, where N1 is random noise such as kTC noise. In this case, a voltage appearing at the reset line 14 in a reset period is represented by 2×(Vref+Voff)−(VDD+N1−Vth) according to equation (9). At this time, a voltage (reset voltage) set at the common node 13 (input portion AIN) is represented by 2×(Vref+Voff)−(VDD+N1−Vth)+N2, where N2 is random noise such as kTC noise. Since the time interval between a clamp period and a reset period is short, N1=N2 in substance. Therefore, a reset voltage is represented by 2×(Vref+Voff)−(VDD−Vth), resulting in a reduction in the influence of random noise.

The first signal read out by the readout circuit 50 in the first readout period P3 after the accumulation period P2 is represented by 2×A×((Vref+Voff)−VDD+Vsig) according to equation (10), where A is the amplification factor of the readout circuit 50, and Vsig is a signal appearing at the signal line 6 based on charges corresponding to incident light.

The voltage of the common node 13 (input portion AIN) in a clamp period in the second reset operation period P4 is set to VDD+N3, where N3 is random noise such as kTC noise. In this case, a voltage appearing at the reset line 14 in a reset period is represented by 2×(Vref+Voff)−(VDD+N3−Vth) according to equation (9). At this time, a voltage (reset voltage) set at the common node 13 (input portion AIN) is represented by 2×(Vref+Voff)−(VDD+N3−Vth)+N4, where N4 is random noise such as kTC noise. Since the time interval between a clamp period and a reset period is short, N3=N4 in substance. Therefore, a reset voltage is represented by 2×(Vref+Voff)−(VDD−Vth), resulting in a reduction in the influence of random noise.

The second signal read out by the readout circuit 50 in the second readout period P5 is represented by 2×A×((Vref+Voff)−VDD) according to equation (10). Calculating the difference between the first and second signals (CDS computation) will obtain a pixel signal represented by $$2 \times A \times ((Vref+Voff)-VDD+Vsig) - 2 \times A \times ((Vref+Voff)-VDD) = 2 \times A \times Vsig$$

That is, a reset operation in the fifth embodiment reduces the influences of random noise and a threshold voltage, and CDS computation reduces the influence of the input offset voltage of the differential amplifier 15.

As an application of the solid-state image sensor according to each embodiment described above, an image sensing apparatus in which the solid-state image sensor is assembled will be exemplarily explained. The concept of the image sensor includes not only an apparatus mainly aiming at image capturing but also an apparatus (for example, a personal computer or portable terminal) accessorily having an image capturing function. The image sensing apparatus includes the solid-state image sensor according to the present invention exemplified as the embodiments, and a processor which processes a signal output from the solid-state image sensor. The processor can include, for example, an A/D converter and a processor which processes digital data output from the A/D converter.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-031460, filed Feb. 22, 2016, which is hereby incorporated by reference herein in its entirety.

What is claimed is:

1. An image sensor including a plurality of pixels, wherein
each pixel includes a photoelectric converter, a pixel amplifier having an input portion to which a signal from the photoelectric converter is input, and a switch configured to connect a reset terminal to the input portion,
the image sensor comprises a signal line to which a signal from the pixel amplifier is supplied, a reset line connected to the reset terminal, and a reset portion configured to reset a voltage of the input portion,
the reset portion includes a capacitor configured to hold, in a first period, a second voltage appearing at the signal line in response to application of a first voltage to the input portion, and a supplier configured to set, in a second period after the first period, the input portion to a reset voltage via the switch by supplying a third voltage corresponding to the second voltage held by the capacitor to the reset terminal via the reset line, and
in the first period, the input portion is disconnected from the supplier while the signal line is connected to the capacitor, and
in the second period, the signal line is disconnected from the capacitor while the input portion is connected to the supplier.

2. The sensor according to claim 1, wherein the capacitor includes a first terminal and a second terminal, the supplier includes a differential amplifier, the differential amplifier includes a first input terminal connected to the second terminal, a second input terminal to which a reference voltage is supplied, and an output terminal,
in the first period, the first terminal is connected to the signal line and the second terminal is connected to the output terminal, and
in the second period, the first terminal and the output terminal are connected to the reset line.

3. The sensor according to claim 2, wherein the supplier supplies, as the third voltage, a voltage obtained by canceling an input offset voltage of the differential amplifier to the reset terminal in the second period.

4. The sensor according to claim 2, wherein the second voltage is equal to the third voltage.

5. The sensor according to claim 2, wherein in the first period, the first voltage is applied to the input portion via the reset line and the switch, and the output terminal is connected to the second terminal.

6. The sensor according to claim 1, further comprising a voltage supplier configured to apply the first voltage to the input portion in the first period.

7. The sensor according to claim 1, wherein the capacitor includes a first terminal and a second terminal, the supplier includes a differential amplifier, the differential amplifier includes a first input terminal connected to one of the first terminal and the second terminal, a second input terminal to which a reference voltage is supplied, and an output terminal,
in the first period, the first terminal is connected to the signal line and the second terminal is connected to the output terminal, and
in the second period, the first terminal is connected to the first input terminal, and the second terminal and the output terminal are connected to the reset line.

8. The sensor according to claim 7, wherein the pixel amplifier comprises a MOS transistor whose gate is connected to the input portion, and
the supplier supplies, as the third voltage, a voltage which cancels a threshold voltage of the pixel amplifier at an output of the pixel amplifier to the reset terminal in the second period.

9. The sensor according to claim 1, wherein the pixel amplifier comprises a MOS transistor whose gate is connected to the input portion, and the pixel is configured to output a voltage, to the signal line, which is obtained by subtracting a threshold voltage of the MOS transistor from a voltage of the input portion.

10. The sensor according to claim 1, further comprising a readout circuit configured to read out a signal output to the signal line.

11. The sensor according to claim 10, wherein the readout circuit reads out a signal output to the signal line as a first signal after an elapse of an accumulation period since a voltage of the input portion is reset by the reset portion, then reads out a signal output to the signal line as a second signal immediately after a voltage of the input portion is reset by the reset portion, and outputs a difference between the first signal and the second signal as a pixel signal.

12. An image sensing apparatus comprising:
an image sensor defined in claim 1; and
a processor configured to process a signal output from the image sensor.

13. An image sensor including a plurality of pixels, wherein
each pixel includes a photoelectric converter, a pixel amplifier having an input portion to which a signal from the photoelectric converter is input, and a first switch configured to connect a reset terminal to the input portion,
the image sensor comprises a signal line to which a signal from the pixel amplifier is supplied, a reset line connected to the reset terminal, and a reset portion configured to reset a voltage of the input portion, and
the reset portion comprises:
a differential amplifier including a first input terminal, a second input terminal to which a reference voltage is supplied, and an output terminal connected to the reset line,
a capacitor including a first terminal and a second terminal connected to the first input terminal,
a second switch configured to control connection between the signal line and the first terminal,
a third switch configured to control connection between the first terminal and the reset line, and
a fourth switch configured to control connection between the second terminal and the reset line.

14. An image sensing apparatus comprising:
an image sensor defined in claim 13; and
a processor configured to process a signal output from the image sensor.

15. The sensor according to claim 1, wherein the photoelectric converter includes a photoelectric conversion film.

16. The sensor according to claim 13, wherein the photoelectric converter includes a photoelectric conversion film.

* * * * *